United States Patent [19]

Martinek

[11] Patent Number: 4,557,018
[45] Date of Patent: Dec. 10, 1985

[54] MEAT FORMER APPARATUS
[75] Inventor: Thomas W. Martinek, Covington, Ind.
[73] Assignee: Teepak, Inc., Oak Brook, Ill.
[21] Appl. No.: 629,031
[22] Filed: Jul. 9, 1984
[51] Int. Cl.$^4$ .................... A22C 7/00; A22C 11/06
[52] U.S. Cl. .................................. 17/49; 17/32; 17/39; 53/122
[58] Field of Search .............. 17/32, 33, 34, 35, 36, 17/37, 38, 39, 40, 41, 42, 49; 53/576, 122

[56] References Cited
U.S. PATENT DOCUMENTS

| | | | |
|---|---|---|---|
| 1,759,587 | 5/1930 | Parker | 17/33 |
| 3,344,467 | 10/1967 | Barbu | 17/38 |
| 3,396,426 | 8/1968 | Ziolko | 17/35 |
| 3,451,098 | 6/1969 | Myles et al. | 17/35 |
| 3,454,980 | 7/1969 | Washburn | 17/35 |
| 3,457,588 | 7/1969 | Myles et al. | 17/41 |
| 3,553,769 | 1/1971 | Myles et al. | 17/49 |
| 3,621,513 | 11/1971 | Kupcikevicius | 17/41 |
| 3,975,795 | 8/1976 | Kupcikevicius et al. | 17/41 |

*Primary Examiner*—Willie G. Abercrombie
*Attorney, Agent, or Firm*—Michael L. Dunn; William J. Crossetta

[57] ABSTRACT

An improved apparatus and process is disclosed which is adopted for controlled displacement of chunk, sectioned and formed meat products during a forced meat encasement process. More particularly, the improved apparatus and method of the instant invention provides a truncated internally conical extending meat former apparatus disposed between the filling nozzle and stuffed casing of a meat casing machine to control the relative displacement of meat which is forced through a filling nozzle into a meat casing to a predetermined arrangement.

17 Claims, 2 Drawing Figures

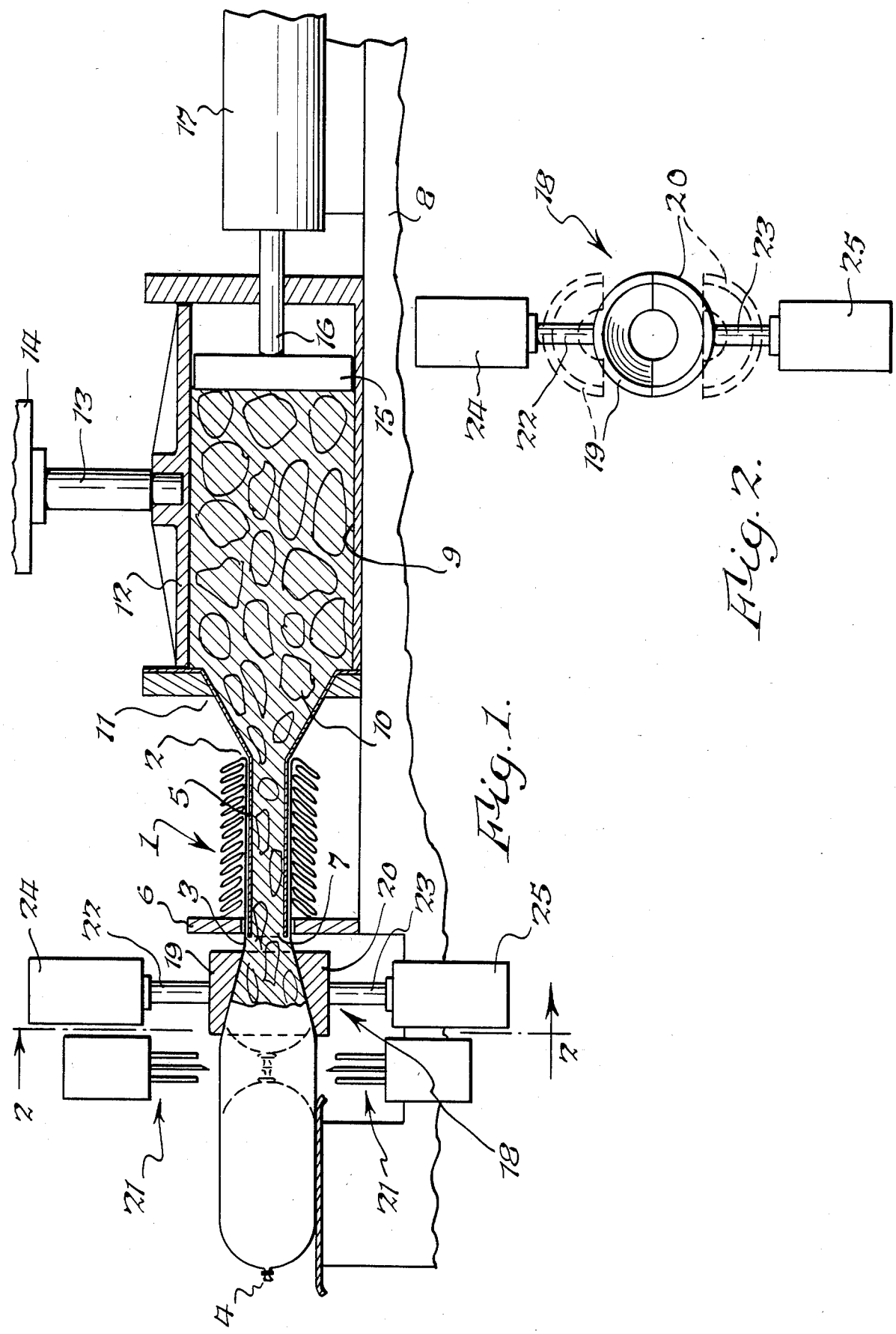

MEAT FORMER APPARATUS

FIELD AND BACKGROUND OF THE INVENTION

This invention relates to the art of stuffing chunk, sectioned and formed meat products into casings for human consumption. More particularly, it relates to an apparatus and method for controlling the relative displacement of stuffing meat, during the stuffing process, to assure proper arrangement of the chunk, sectioned or formed meat in the stuffed casing.

DESCRIPTION OF THE PRIOR ART

The stuffing of chunk, sectioned and formed meat products into casing has been a continuing commercial problem to the meat packing industry. As distinct from the very sophisticated automated machinery typically utilized in the high speed stuffing of ground and pastry state meats for sausages, etc., the machinery utilized in stuffing chunk, sectioned and formed meat products has been slower and more cumbersome to operate.

Conventionally, the stuffing of meat which had not been ground or otherwise reduced to the pastry state had been manually performed. Typically, tubular casings were cut into short predetermined lengths and the individual casings were fitted to extrusion filling nozzles where the meat was extruded therein. Upon filling, the stuffed casing was shaped and the ends were hand or automatically tied to form the stuffed meat product.

The hand shaping of the casing served various purposes but was mainly to standardize the size and shape of the stuffed casing and enhance the physical appearance thereof. Not only is it desirable in the industry to provide an encased meat product having a standardized and visually appealing exterior appearance, but the commercial value of such encased meat products is greatly enhanced by the physical appearance of its cross section. Thus for example, when encasing ham chunks, sections and pieces in tubular casing for retail sale, it is desirable that cross sections along the longitudinal axis of the encased product physically have a lean ham appearance in the center with fat being dispersed around the outside perimeter of the encased product. Typically, an encased product having fat intermingled within the center of its cross section will be considered by the consumer as having inferior quality than a product having the same amount of fat content but dispersed along the outside perimeter. The result of course is that the latter commands a higher price in the marketplace than the former.

To achieve encased meat products having a more desirable physical appearance the skill of the stuffing machine operator is heavily relied upon to assure that meat chunks, sections and pieces being extruded through the filling nozzle reach their proper position in the stuffed casing. In a typical operation, the machine operator loads a stuffing hopper arranging the meat to generally conform with its desired placement in the stuffed casing. The meat is then compressed in that same general arrangement and forced through a filling nozzle into the casing to be stuffed.

With the increasing demands of economy and efficiency of operation, newly automated apparatus has been developed for the stuffing of chunk, sectioned and formed meat products into casing. In such automated apparatus there is still heavy reliance upon the skill of the operator in loading the stuffing hopper with the meat properly arranged, but the system and method of casing handling has been dramatically changed. Typically, casing in the form of a shirred stick is inserted on a stuffing horn (filling nozzle) and once the operator has arranged the meat in the stuffing hopper and activated the stuffing mechanism automatic devices control the size of the stuffed casing, clip and tie the ends of the stuffed casing and eject the final product from the machine. A shirred stick of casing is a 40 to 160 foot section of tubular casing which has been gathered and compressed along its longitudinal axis, to a significantly shortened length usually up to about 16 inches long, in such manner as to maintain a clear passage through the interior of the tubing and thus significantly reduce the handling size of long lengths of the material.

In the aforesaid process a shirred stick having a closed end is inserted over the stuffing horn. The stuffing meat is injected under pressure through the stuffing horn against the closed end, thus deshirring the shirred stick and filling the tubing to its original unshirred length. When stuffing such meat into shirred casing, there is a significant difference between the smaller internal diameter of the filling nozzle and the larger internal diameter of the stuffed casing so that as the operator arranged compressed chunk sectioned and formed meat is discharged from the nozzle it frequently tumbles and becomes displaced from its original position relative to other stuffing meat. The displacement of the meat pieces is generally random and difficult, if not impossible, to predict resulting in the production of inferior quality encased meat when fat content is improperly dispersed throughout a cross section of the stuffed product.

In the last several years, several devices have been proposed for the more efficient stuffing of chunk, sectioned and formed meats. Each of the apparatus automate steps in the aforesaid conventional method of meat stuffing with significant reductions in labor intensity and increases in efficiency. Though manufacturing speed and labor efficiency has been significantly enhanced, a problem still exists in assuring proper fat placement for the production of high quality product.

Accordingly, it is an object of the present invention to provide a method and apparatus which avoids the shortcomings and drawbacks encountered in the prior art.

Another object of the present invention resides in providing an improved method and apparatus for controlling the displacement of chunk, sectioned and formed meat, when stuffed into casings, which have been adapted for the automatic production of stuffed meat products.

A further object of the present invention resides in providing a method and apparatus for stuffing meat which requires minimum manual labor.

According to the present invention, shirred tubular casing is inserted over a filling nozzle of a meat extruding means and has disposed around at least a portion of the exterior surface of the deshirred tubular casing and extending between the discharge end of the filling nozzle and the stuffed casing, a truncated internally conical extending meat former device having a smallest internal diameter approximately equal to or greater than the internal diameter of the discharge end of the filling nozzle and being disposed proximate thereto and having progressively larger internal diameters through its truncated internally conical length. The truncated length of said meat former device between said larger and said smallest diameter is sufficient so that the angle of said internally conical extending meat former device from its internal axis is not greater than about 35°. The largest internal diameter can be greater than, equal to or less than the diameter of the stuffed casing.

The internally conical extending former device of the invention can comprise a single continuous internal conical surface or can be comprised of two or more separate surfaces combined to form an internal conical arrangement. The internal conical surface or arrangement of surfaces can be at a fixed angle to the longitudinal axis or can be variably adjustable for use in multiple different nozzle to stuffed casing size relations. Typically, when the former device comprises a single continuous internally conical extending surface the conical angle to the horizontal axis is fixed. When the former device comprises two or more separate surfaces combined to form an internal conical arrangement, the conical angle to the longitudinal axis typically is variably adjustable. Generally, it is preferred to form the internal conical arrangement using at least two surfaces which can be engaged or disengaged automatically, or by the machine operator, as a regular part of the operation of a stuffing cycle or at the option of the operator.

In the process of the invention an extruder filling nozzle (stuffing horn), configured to receive shirred casing, engages a meat stuffing hopper, which receives and holds chunk, sectioned and formed meat for stuffing. A stuffing means forces meat from the hopper through the filling nozzle and a truncated internally conical extending meat former of the invention is positioned proximate the discharge end of the nozzle. According to the present invention a closed end of the shirred casing which has been inserted over the filling nozzle receives the stuffing meat and acts to deshirr the casing drawing the casing through the meat former. Prearranged meat, contained in the hopper, is forced by the stuffing means from the hopper through the nozzle into the casing. The casing deshirrs from the force of the meat stuffing process drawing the casing through the meat former means and stuffing the casing to its larger stuffed diameter. Typically, means then engage the last filled end of the stuffed casing, necking down a portion of the stuffed tube, constricting the last filled end and closing it. The casing is clipped and a first filled section of casing from the next sequential action of the filling process is tied providing the closed end for repetition of the stuffing cycle.

FIG. 1 is a side elevational partial sectional view of a meat stuffing arrangement in accord with the invention.

FIG. 2 is an illustration of a meat former in accord with the invention.

Referring now to FIG. 1 wherein a shirred casing stick 1 is shown inserted over the peripheral surface of stuffing horn 5 positioned for reverse deshirring at end 2 whereby deshirred casing 3 passes between the filling nozzle 5 and the shirred stick 1 by the force of the discharging meat product 10 from the discharge end 7 of filling nozzle 5 against the closed end 4 of the shirred casing stick. The shirred stick is secured to the nozzle by restraining device 6. Filling nozzle 5 and meat hopper 9 are shown, each removably mounted to a base apparatus 8 and removably interconnected to each other 11 to allow a forced flow of stuffing meat 10 from hopper 9 through nozzle 5 into deshirred casing 3.

Meat hopper lid 12, secured by piston rod 13 of pneumatic cylinder 14 is fitted to engage the filling opening of meat hopper 9. Piston ram 15, secured by piston rod 16 activated by pneumatic cylinder 17 is fitted such that it extends through at least a part of the internal area of the meat hopper in the direction of flow of stuffing meat 10 through filling nozzle 5. Meat former device 18, comprising two truncated conically extending halves 19 and 20, are removably mounted to engage the exterior surface of the casing extending beyond the discharge end 7 of the filling nozzle. Automatic cutting and binding device 21 is arranged to neck down the last filled end of the stuffed casing and automatically bind it at two separate but closely proximate places along the casing. The cutting device is arranged to cut the casing between the two proximate binding points thus completely separating the stuffed section of casing from the shirred stick while creating a new closed end for the next stuffing cycle.

Referring now to FIG. 2 wherein is shown a meat former device 18 comprising truncated conically extruding halves 19 and 20, secured by piston rods 22 and 23 respectively of pneumatic cylinders 24 and 25 which are mounted to the base structure. The smallest diameter of the truncated length of the meat former engages the exterior surface of the deshirred casing 3 proximate the discharge end 7 of the filling nozzle and extends in increasingly greater diameter through its truncated length, which in this embodiment extends until the internal largest diameter of the truncated meat former is the same as the external diameter of the stuffed casing and the angle of the increasing diameter from the internal axis is 30°.

Referring now to FIGS. 1 and 2, in accord with the process of the invention, a shirred fibrous cellulose casing stick 1 having an average thickness of 5 mils and a stuffing diameter of 3½ inches is inserted over filling nozzle 5 and secured by restraining device 6 so that the closed end 4 of the shirred stick 1 is proximate discharge end 7 of the filling nozzle. Pneumatic cylinders 24 and 25 are activated causing piston rods 22 and 23 to extend toward each other bringing truncated conically extending former halves 19 and 20 together. Hopper 9 is filled with stuffing meat arranged so that fatty meat is contained on the outside perimeter, lid 12 is engaged by activating pneumatic cylinder 14 through piston rod 13. Pneumatic cylinder 17 is activated causing piston rod 16 to extend piston ram 15 through the meat hopper forcing the pre-arranged stuffing meat 10 from hopper 9 through the discharge end of filling nozzle 5 into deshirred casing 3 against closed end 4 of the casing. The casing deshirrs from the shirred stick 1 and is stuffed to its stuffing diameter. Former halves 19 and 20 are disengaged by deactivating pneumatic cylinders 24 and 25, automatic cutting and binding device 21 is activated and necks down the last filled end of the stuffed casing. The necked down casing is bound with U shaped clips at two proximate points and the casing is cut between the two points. Automatic cutting and binding device 21 disengages, former halves 19 and 20 re-engage and the process is repreated. The resulting stuffed meat casing is inspected and found to contain meat in substantially the same arrangement as placed in the stuffing hopper.

What is claimed is:

1. An improved arrangement for the forced stuffing of meat through a tubular filling nozzle means into a tubular meat casing means wherein the internal diameter of the filling nozzle means, at its discharge end, is smaller than the internal diameter of the meat stuffed tubular casing means, the improvement comprising, having disposed around at least a portion of the exterior surface of the tubular casing means, between said smaller diameter filling nozzle means and said larger diameter meat stuffed casing means, a truncated, internally conical extending meat former device having a smallest internal diameter approximately equal to or greater than said internal diameter of said filling nozzle means and being disposed proximate thereto, said former device having progressively larger internal diameters through its truncated length wherein the truncated length of said meat former device, contacting said casing between said larger and said smaller diameter is sufficient so that the internal angle of said conically extending meat former device from its internal axis is less than about 35°.

2. The arrangement of claim 1 wherein the former device comprises at least two truncated internally conical extending structures which are removably positioned.

3. The arrangement of claim 1 wherein the former device comprises a single continuous internal conical surface.

4. The arrangement of claim 1 wherein the former device comprises multiple surfaces arranged to form a truncated internally conical extending structure.

5. The arrangement of claim 4 wherein said multiple surfaces are adjustably mounted for multiple angles to the longitudinal axis.

6. The arrangement of claim 1 wherein the truncated former device extends from a position proximate the discharge end of the filling nozzle to a position proximate the largest stuffed casing diameter.

7. The arrangement of claim 1 wherein stuffing meat is forced from a meat hopper means through said filling nozzle means into a closed end of a shirred stick of casing.

8. The arrangement of claim 7 wherein the stuffing meat is forced by piston ram means through said filling nozzle.

9. A meat former apparatus comprising one or more surfaces assembled in truncated internally conical extending arrangement having a smallest internal diameter approximately equal to or greater than the internal diameter of a meat filling nozzle and larger internal diameters in its truncated length such that the internal conical angle from its internal axis is less than about 35°.

10. The apparatus of claim 9 comprising a single internally conical extending surface.

11. The apparatus of claim 9 comprising two truncated internally conical extending surfaces.

12. The apparatus of claim 11 wherein the surfaces are removably positioned.

13. The apparatus of claim 9 comprising multiple surfaces arranged to form a truncated internally conical extending structure.

14. The apparatus of claim 13 wherein said multiple surfaces are adjustable mounted for multiple angles to the longitudinal axis.

15. A method of controlling the relative displacement of meat into a meat casing means wherein meat pieces are pre-arranged in related position, forced through a filling nozzle and stuffed into said meat casing means, the method comprising disposing around said meat casing means and between said filling nozzle and the stuffed casing, a meat former comprising a truncated internally conical extending device having a smallest internal diameter approximately equal to or greater than the internal diameter of the filling nozzle and arranged proximate thereto and at least one large diameter approximately equal to or less than the external diameter of the stuffed meat casing, wherein the internal angle of the interior surface of said conically extending truncated meat former, from its internal axis at points where it contacts the casing is not greater than about 35°, and extruding said meat through said nozzle and said meat former means at a pressure so that a major portion of the flow of said extruded meat from the nozzle to the stuffed sausage casing occurs without relative displacement of the meat from its prearranged related position.

16. The method of claim 15 wherein said meat former device comprises two or more internally conical extending surfaces.

17. The method of claim 16 wherein said surfaces are movably positioned.

* * * * *